US009402147B2

(12) United States Patent (10) Patent No.: US 9,402,147 B2
Hsu et al. (45) Date of Patent: Jul. 26, 2016

(54) ENHANCED PAGING MECHANISM FOR MACHINE TYPE COMMUNICATION

(75) Inventors: Chia-Chun Hsu, Taipei (TW); Hung-Yu Wei, Taipei (TW); Guan-Yu Lin, Nantou County (TW); Ching-Chun Chou, Taipei (TW)

(73) Assignees: NATIONAL TAIWAN UNIVERSITY, Taipei (TW); MEDIATEK, INC., Hsin-Chu (TW)

( * ) Notice: Subject to any disclaimer, the term of this patent is extended or adjusted under 35 U.S.C. 154(b) by 17 days.

(21) Appl. No.: 13/545,204

(22) Filed: Jul. 10, 2012

(65) Prior Publication Data

US 2013/0015953 A1 Jan. 17, 2013

Related U.S. Application Data

(60) Provisional application No. 61/506,463, filed on Jul. 11, 2011.

(51) Int. Cl.
*H04W 4/00* (2009.01)
*H04W 4/08* (2009.01)
(Continued)

(52) U.S. Cl.
CPC ............... *H04W 4/005* (2013.01); *H04W 4/08* (2013.01); *H04W 68/02* (2013.01); *H04B 7/00* (2013.01)

(58) Field of Classification Search
CPC ....... H04W 4/003; H04W 4/005; H04W 4/08; H04W 68/00; H04W 8/26; H04W 8/06; H04B 7/00; H04L 12/66
USPC ................. 340/7.46, 7.45, 7.2; 455/458, 500; 370/310, 311
See application file for complete search history.

(56) References Cited

U.S. PATENT DOCUMENTS

| 5,224,150 | A | * | 6/1993 | Neustein | 340/7.44 |
| 6,021,311 | A |  | 2/2000 | Gibson et al. | 455/31.3 |
| 8,077,677 | B2 | * | 12/2011 | Wang et al. | 370/332 |

(Continued)

FOREIGN PATENT DOCUMENTS

| CN | 101690308 | 6/2007 |
| CN | 101931859 A | 6/2009 |

(Continued)

OTHER PUBLICATIONS

International Search Report and Written Opinion of International Search Authority for PCT/CN2012/078476 dated Oct. 18, 2012 (10 pages).

(Continued)

*Primary Examiner* — Jennifer Mehmood
*Assistant Examiner* — Omar Casillashernandez
(74) *Attorney, Agent, or Firm* — Imperium Patent Works; Zheng Jin; Helen Mao

(57) ABSTRACT

Enhanced paging mechanisms are proposed for Machine Type Communication (MTC) devices in 3GPP networks. First, adaptive paging is proposed to adaptively allocate extra paging occasions for MTC devices with no extra procedure or power consumption on normal UEs. Second, group paging is proposed to simultaneously page a plurality of MTC devices with one paging. Group paging is controlled in different levels for optimized signaling and easier management. In one embodiment, group broadcasting and group release are used. Third, paging with response policy is proposed to pre-define or dynamically configure paging response policies for MTC devices.

23 Claims, 7 Drawing Sheets

(51) Int. Cl.
*H04W 68/02* (2009.01)
*H04B 7/00* (2006.01)

(56) References Cited

U.S. PATENT DOCUMENTS

| | | | | |
|---|---|---|---|---|
| 8,238,909 | B2* | 8/2012 | Guo et al. | 455/435.1 |
| 8,433,345 | B2* | 4/2013 | Li et al. | 455/458 |
| 8,565,755 | B1* | 10/2013 | Badakere Ramachandra et al. | 455/424 |
| 8,705,445 | B2* | 4/2014 | Watfa et al. | 370/328 |
| 2004/0057387 | A1 | 3/2004 | Yi et al. | 370/252 |
| 2005/0111393 | A1 | 5/2005 | Jeong et al. | 370/312 |
| 2008/0182596 | A1 | 7/2008 | Wang et al. | 455/458 |
| 2010/0085962 | A1* | 4/2010 | Issaeva | H04W 76/041 370/355 |
| 2010/0128805 | A1 | 5/2010 | Tanno et al. | 375/260 |
| 2010/0248773 | A1 | 9/2010 | Rosay et al. | 455/522 |
| 2011/0058572 | A1* | 3/2011 | Du et al. | 370/458 |
| 2011/0140846 | A1* | 6/2011 | Blanz et al. | 340/7.1 |
| 2011/0252235 | A1* | 10/2011 | Dolan et al. | 713/168 |
| 2012/0002614 | A1* | 1/2012 | Ekici et al. | 370/329 |
| 2012/0004003 | A1* | 1/2012 | Shaheen et al. | 455/509 |
| 2012/0030358 | A1* | 2/2012 | MacKenzie | 709/226 |
| 2012/0040700 | A1* | 2/2012 | Gomes et al. | 455/500 |
| 2012/0076085 | A1 | 3/2012 | Chou | 370/329 |
| 2012/0106431 | A1 | 5/2012 | Wu et al. | 370/312 |

FOREIGN PATENT DOCUMENTS

| | | |
|---|---|---|
| CN | 101931895 A | 6/2009 |
| CN | 102202394 A | 3/2010 |
| EP | 1959615 A1 | 2/2007 |
| JP | H02121597 | 10/1988 |
| JP | 2000504541 | 12/1996 |
| JP | 2005530451 | 6/2002 |
| JP | 2005117655 | 10/2003 |
| JP | 2010518765 | 2/2007 |
| KR | 20110012885 A | 7/2009 |
| TW | I335154 | 11/2004 |
| TW | I334285 | 1/2006 |
| TW | 201208431 A | 2/2010 |
| WO | WO2006052772 A2 | 11/2004 |
| WO | WO2011006437 | 7/2009 |
| WO | WO2011013879 A1 | 7/2009 |
| WO | WO2011053219 | 10/2009 |

OTHER PUBLICATIONS

EPO, Office Action for the EP application 12811964 dated Nov. 20, 2014 (6 pages).

JPO, Office Action for the JP application 2014-509601 dated Nov. 11, 2014 (6 Pages).

Taiwan IPO, Office Action for TW patent application 101124719 dated Jul. 21, 2014 (5 pages).

* cited by examiner

| RNTI | Usage | Transport Channel | Logical Channel |
|---|---|---|---|
| RNTI FFFE | Paging and System Information change notification | PCH | PCCH |

410

| Ns | PO when i_s=0 | PO when i_s=1 | PO when i_s=2 | PO when i_s=3 |
|---|---|---|---|---|
| 1 | 9 | N/A | N/A | N/A |
| 2 | 4 | 9 | N/A | N/A |
| 4 | 0 | 4 | 5 | 9 |

420

| Ns | PO when i_s=0 | PO when i_s=1 | PO when i_s=2 | PO when i_s=3 |
|---|---|---|---|---|
| 1 | 0 | N/A | N/A | N/A |
| 2 | 0 | 5 | N/A | N/A |
| 4 | 0 | 1 | 5 | 6 |

430

```
Paging ::=                          SEQUENCE {
    pagingRecordList                PagingRecordList
    systemInformationModification   ENUMERATED {true}
    etws-Indication                 ENUMERATED {true)
    nonCriticalExtension            Paging-v890-IEs
}

Paging-v890IEs :: =                 SEQUENCE {
    lateNonCriticalExtension        OCTET STRING
    nonCriticalExtension            Paging-v920-Ies
}

Paging-v920-Ies ::=     SEQUENCE {
    cmas-Indication-r9              ENUMERATED {true}
    nonCriticalExtension            SEQUENCE {}
}

PagingRecordList ::=    SEQUENCE (SIZE (1..maxPageRec)) of PagingRecord

PagingRecord ::=        SEQUENCE {
    ue-Identity             PagingUE-Identity,
    cn Domain               ENUMERATED {ps, cs},
    ...
}

PagingUE-Identity ::=   CHOICE {
    s-TMSI                  S-TMSI,
    imsi                    IMSI,
    ...
}

TMSI :: =               SEQUENCE {SIZE (6..21)) of IMSI-Digit

IMSI-Digit ::=          INTEGER (0..9)
```

RRC PAGING MESSAGE

FIG. 7

ENHANCED PAGING MECHANISM FOR MACHINE TYPE COMMUNICATION

CROSS REFERENCE TO RELATED APPLICATIONS

This application claims priority under 35 U.S.C. §119 from U.S. Provisional Application No. 61/506,463, entitled "Enhanced Paging Mechanism for Machine Type Communication", filed on Jul. 11, 2011; the subject matter of which is incorporated herein by reference.

TECHNICAL FIELD

The disclosed embodiments relate generally to Machine type communications, and, more particularly, to enhanced paging mechanisms for machine type communications in mobile networks.

BACKGROUND

Machine type communication is a form of data communication that involves one or more entities that do not necessarily need human interaction. A service optimized for machine type communication differs from a service optimized for human-to-human (H2H) communication. Typically, machine type communication services are different to current mobile network communication services as they involve different market scenarios, pure data communication, lower cost and effort, and a potentially very large number of communicating terminals with little traffic per terminal.

The terms Machine-to-Machine (M2M) and Machine-Type Communications (MTC) are used to describe use cases and illustrate the diverse characteristics of machine type communication services. M2M and MTC devices will be part of the next generation wireless networks to enable "internet of things". Potential M2M and MTC applications include security, tracking and tracing, payment, health, remote maintenance/control, metering, and consumer devices. The main characteristics of machine type communication services include low mobility, time controlled, delay tolerant, packet-switched only, small data transmissions, mobile originated only, infrequent mobile terminated, MTC monitoring, priority alarm, secure connection, location specific trigger, network provided destination for uplink data, infrequency transmission, and group based MTC features.

The end-to-end application between an MTC device and an MTC server or between two MTC devices is provided by 3GPP systems. A 3GPP mobile network provides transport and communication services optimized for MTC. However, the number of M2M devices in the mobile network is expected to be much larger than the current number of UEs, i.e., an order larger. With such vast number, the network could run out paging resources and incur extra delay. For example, with maxPageRec=16 and the maximum paging subframe is four for a radio frame, the mobile network could page 6,400 MTC devices in a second at most. Thus, a potential problem is that the current paging resource will not be enough for future MTC devices.

Currently, there are a few solutions for page overload in a 3GPP mobile network. One solution is to prioritize paging on the S1 application protocol (S1AP) to selectively discard pages at temporary overload. Another solution is to change paging configuration dynamically by system information block (SIB) modification. Both solutions, however, may not work well for MTC devices. This is because, for certain M2M applications, it may have very low duty cycle due to power saving concern. For example, an MTC device only wakes up when it has uplink (UL) data or has much longer Discontinuous reception (DRX) in idle mode than currently allowed. In addition to DRX in idle mode, an MTC device may even have longer sleep cycle if the DRX value is not long enough for its operation. When paging occurrence (PO) happens, an MTC device does the following: wakes up before PO and checks system information (SI) value tag and obtains the latest SIBs; monitors Physical downlink control channel (PDCCH) for Paging-Radio Network Temporary Identifier (P-RNTI) for several DRX cycles; responds if there is a matching ID; and goes back to sleep when time is up.

If paging overload happens, it takes several seconds for eNB to reconfigure the paging channel. After reconfiguration, it takes more time to digest the congestion. Therefore, it is possible that eNB would not be able to page an MTC device in time before it goes back to sleep. Then the delay would be minutes or even hours. Furthermore, if eNB decides to reconfigure paging configuration after the overload is resolved, then a normal UE has to acquire the SIBs TWICE for no benefit. Thus, such paging overload event would degrade performance for normal UEs in idle mode.

SUMMARY

Enhanced paging mechanisms are proposed for Machine Type Communication (MTC) devices in 3GPP networks. First, adaptive paging is proposed to adaptively allocate extra paging occasions for MTC devices with no extra procedure or power consumption on normal UEs. Second, group paging is proposed to simultaneously page a plurality of MTC devices with one paging. Group paging is controlled in different levels for optimized signaling and easier management. In one embodiment, group broadcasting and group release are used. Third, paging with response policy is proposed to pre-define or dynamically configure paging response policies for MTC devices.

Under adaptive paging, extra paging occasions are adaptively allocated. In one embodiment, a "continue" flag is introduced in the paging message. When the eNB cannot insert all the pages in the corresponding PO, it set the "continue" flag to be TRUE. Normal UE would ignore the flag and proceed as legacy behavior. For MTC devices, however, when the flag is set, instead of going to DRX until next PO, MTC devices would "continue" to monitor for PO if no paging has been received. Once the MTC device receives paging, it stops paging monitoring disrespect of the flag and responds to the paging.

Group paging is another mechanism to enhance paging performance for MTC devices. M2M grouping can be useful in many levels. In AS level, a group ID can be configured for an M2M group. One paging can be used to page all MTC devices in the group monitoring paging. Such M2M group can be controlled by eNB to save AS resource. In NAS level, it makes sense that M2M grouping can be done in the core network level, e.g., controlled by MME to save signaling overhead. In application level, M2M grouping can be controlled by MTC user or MTC server for easier management. The different levels of M2M grouping can be independent or coexist to provide flexibility. Group paging may be used for Group broadcasting. In some MTC applications, e.g., OAM or software update, it is likely that the content of message would be the same for a group of MTC devices. Therefore, group broadcasting would be useful and save radio resource.

For M2M paging, when a device ID is included in paging message, it may have two possible meanings. In a first meaning, upon receiving the paging, the paged MTC device must wake up and establish connection (Mobile Terminated MT session). In a second meaning, the network asks the paged MTC device whether it would like to wake up to establish connection (Mobile Originated MO session). Thus, a paging message should indicate whether the paged MTC device should respond immediately (MT session) or should respond only based on availability of MO data (MO session). In addition to indicate different paging responses, different response policies can be configured to optimize paging performance. In a first embodiment, paging response policy is pre-defined for the devices. In a second embodiment, paging response policy is dynamically assigned.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 illustrates an RRC paging message that can be used for group paging.

DETAILED DESCRIPTION

Reference will now be made in detail to some embodiments of the invention, examples of which are illustrated in the accompanying drawings.

Figure 1:
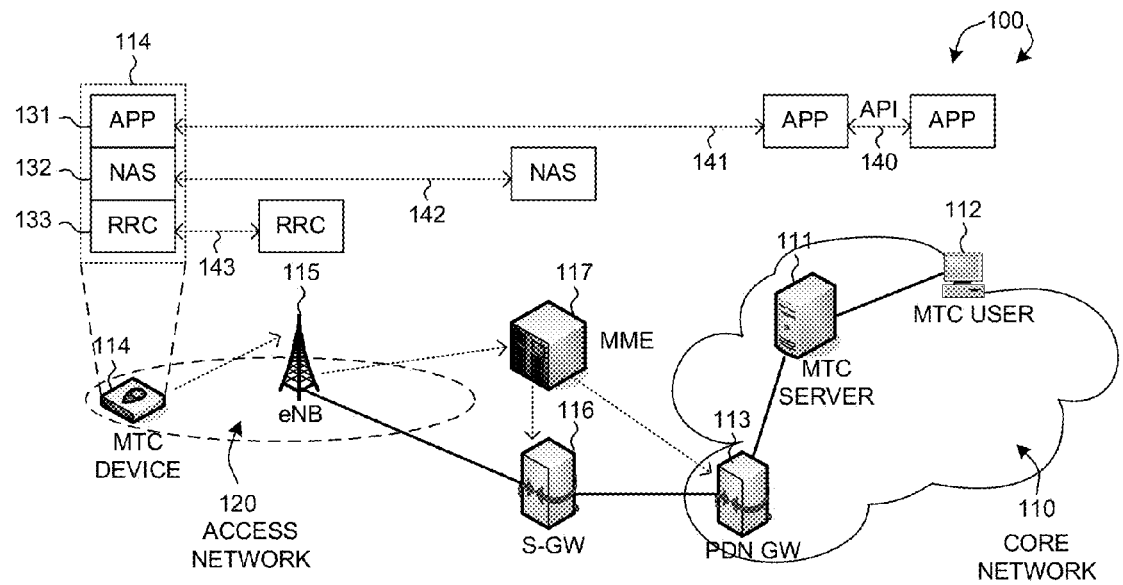
FIG. 1 illustrates a 3GPP network that supports enhanced paging for Machine-Type Communications (MTC) in accordance with one novel aspect.

FIG. 1 illustrates a 3GPP network 100 that supports enhanced paging for Machine-Type Communications (MTC) in accordance with one novel aspect. 3GPP network 100 comprises an MTC server 111 that provides various MTC services to an MTC user 112 by communicating with a plurality of MTC devices (e.g., MTC device 114 as illustrated in FIG. 1). In the example of FIG. 1, MTC server 111, MTC user 112, and a packet data network gateway (PDN GW) 113 belong to part of a core network 110. MTC device 114 and its serving base station (eNB) 115 belong to part of a radio access network (RAN) 120. MTC server 111 communicates with MTC device 114 through PDN GW 113, serving gateway (S-GW) 116, and eNB 115. In addition, a mobility management entity (MME) 117 communicates with eNB 115, S-GW 116 and PDN GW 113 for mobility management of wireless access devices in 3GPP network 100. It is noted that, the term MTC is referred to as machine-to-machine (M2M) communication as compared to human-to-human (H2H) communication, while an MTC device is referred to as an M2M device as compared to H2H device.

In the example of FIG. 1, MTC server 111 provides various MTC services/applications to MTC user 112 in application (APP) protocol layer through an established application-programming interface (API) 140. Typical MTC applications include security (e.g., surveillance system), tracking and tracing (e.g., pay as you drive), payment (e.g., vending and gaming machines), health (e.g., health persuasion system), remote maintenance/control, metering (e.g., smart grid), and consumer devices (e.g., eBooks). To provide the end-to-end MTC services, MTC server 111 communicates with the plurality of MTC devices in the 3GPP network. Each MTC device (e.g. MTC device 114) comprises various protocol layer modules to support the end-to-end MTC applications and data connections. In the application level, APP module 131 communicates with MTC server 111 in APP protocol layer (e.g., depicted by dashed line 141), which provides the end-to-end control/data. In the network level, NAS module 132 communicates with MME 117 in Non-Access Stratum (NAS) protocol layer (e.g., depicted by dashed line 142), which supports mobility management and other signaling functionality. In the RAN level, RRC module 133 communicates with eNB 115 in Radio Resource Control (RRC) protocol layer (e.g., depicted by dashed line 143), which takes care of broadcast of system information, RRC connection control, paging, radio configuration control, QoS control, etc.

In mobile communication networks, paging is used to search for idle user equipments (UEs) and establish a signaling connection. Paging, for example, is triggered by downlink packets arriving to the serving gateway (S-GW). When the S-GW receives a downlink packet destined for an idle UE, it does not have an eNB address to which it can send the packet. The S-GW instead informs an MME that a downlink packet has arrived. The MME knows in which tracking area (TA) the UE is roaming and it sends a paging request to all eNBs within the TA lists. Upon reception of the paging message, the UE responds to the MME and the bearers are activated so that the downlink packet may be forwarded to the UE.

There are various paging procedures defined in 3GPP networks. For LTE core network (CN), a paging procedure is used by the network to request the establishment of a NAS signaling connection to the UE. Another purpose of the paging procedure is to prompt the UE to reattach if necessary because of a network failure. Additionally, the network can use the paging procedure to initiate the mobile terminating CS fallback procedure. For LTE radio access network (RAN), paging is used to transmit paging information to a UE in RRC_IDLE; to inform UEs in RRC_IDLE or in RRC_CONNECTED about a system information change; to inform about an ETWS primary notification and/or ETWS secondary notification; and/or to inform about a CMAS notification.

The number of M2M devices in the mobile network is expected to be much larger than the current number of UEs, i.e., an order larger. With such vast number, the network could run out paging resources and incur extra delay. For example, with maxPageRec=16 and the maximum paging subframe is four for a radio frame, the mobile network could page 6,400 MTC devices in a second at most. Thus, a potential problem is that the current paging resource will not be enough for future MTC devices. Furthermore, for some M2M applications, it may have very low duty cycle due to power saving concern. Therefore, paging overload may cause unacceptable long delay to MTC devices if MTC paging is selectively discarded due to its lower priority, or degrade power performance for normal UE in idle mode if paging configuration is dynamically changed by system information (e.g., SIB) modification, because a normal UE has to acquire the SIBs TWICE.

In one novel aspect, enhanced paging mechanisms are used for MTC devices in 3GPP networks. First, adaptive paging is proposed to adaptively allocate extra paging occasions for MTC devices with no extra procedure or power consumption on normal UEs. Second, group paging is proposed to simultaneously page a plurality of MTC devices with one paging. Group broadcasting and group release are also proposed. Third, paging with response policy is proposed to pre-define or dynamically configure paging response policies for MTC devices.

Figure 2:
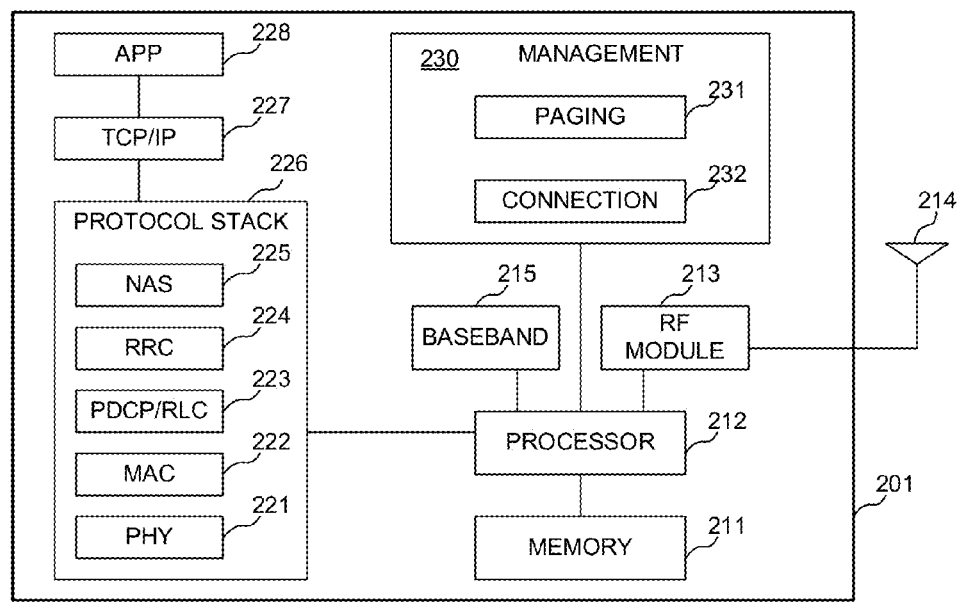
FIG. 2 illustrates a simplified block diagram of an MTC device in accordance with one novel aspect.

FIG. 2 illustrates a simplified block diagram of an MTC device 201 in accordance with one novel aspect. MTC device 201 comprises memory 211, a processor 212, a radio frequency (RF) module 213 coupled to antenna 214, a baseband module 215, a 3GPP protocol stack module 226 supporting various protocol layers including NAS 225, RRC 224, PDCP/RLC 223, MAC 222 and PHY 221, a TCP/IP protocol stack module 227, an application module 228, and a management module 230 including a paging management module 231, and a connection management module 232. The various modules are function modules and may be implemented by software, firmware, hardware, or any combination thereof. The function modules, when executed by processor 212 (via program instructions contained in memory 211), interwork with each other to allow MTC device 201 to perform adaptive paging, group paging, group broadcasting, and/or paging with response policy accordingly. For example, the paging management module 231 is responsible for monitoring paging occasions and responds to paging, while the connection management module 232 is responsible for setup/release connections with the network.

Figures 3, 4:
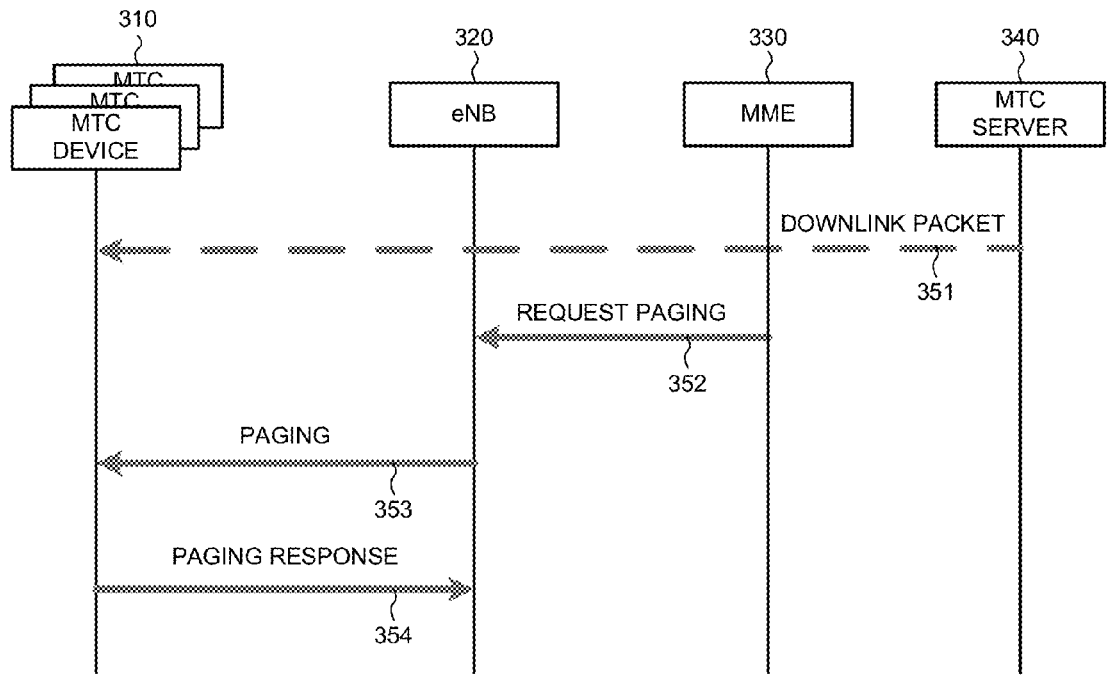
FIG. 3 illustrates enhanced paging mechanism for MTC devices in accordance with one novel aspect in a mobile communication network.
FIG. 4 illustrates paging frame (PF) and paging occasion (PO) defined in a 3GPP network.

FIG. 3 illustrates enhanced paging mechanisms for MTC devices in accordance with one novel aspect in a mobile communication network. In the example of FIG. 3, a plurality of MTC devices (e.g., MTC device 310) communicate with MTC server 340 via eNB 320 and MME 330. In step 351, MTC server 340 initiates downlink packets to MTC device 310. In step 352, MME 330 sends a paging request to eNB 320. In step 353, eNB 320 sends an RRC paging message to MTC 310. Finally, in step 354, MTC 310 receives the paging message and sends a paging response back to eNB 320. In a first novel aspect, MTC device 310 monitors paging occasions adaptively based on a "continue flag" contained in the paging message. In a second novel aspect, MTC device 310 monitors a paging channel using a group paging ID, which can be controlled in AS level, NAS level, or Application level, independently or in any combination thereof. In a third novel aspect, MTC device 310 responds to paging message based on a pre-defined or dynamically assigned paging policy.

FIG. 4 illustrates paging frame (PF) and paging occasion (PO) defined in a 3GPP network. A Paging Frame is one radio frame, which may contain one or multiple Paging Occasions. PF is given by the following equation:

$$SFN \bmod T = (T/N)^*(UE\_ID \bmod N)$$

where
$T = \min(T_C, T_{UE})$ : minimum DRX cycle between UE specific and cell specific
Default DRX cycle is broadcast in system information
UE specific DRX is configured by upper layer
$N = \min(T, nB)$: number of paging frames in a paging cycle of the UE
$nB = \{4T, 2T, T, T/2, T/4, T/8, T/16, T/32\}$ (SIB2, IE nB)
UE_ID=IMSI mod 1024 (stored in USIM)

A Paging Occasion is a subframe where there may be Paging Radio Network Temporary Identifier (P-RNTI) transmitted on a Physical downlink control channel (PDCCH) addressing a paging message. As illustrated in table 410, a paging message is used for paging and system information change notification. The transport channel for paging is called a paging channel (PCH), and the logical channel for paging is called a paging control channel (PCCH). As illustrated in table 420 (for FDD) and table 430 (for TDD), the index i_s pointing to PO from subframe pattern will be derived from the following calculation:

$$i\_s = \text{floor}(UE\_ID/N) \bmod Ns$$

where
$Ns = \max(1, nB/T) = \max(1, \{4, 2, 1, \frac{1}{2}, \frac{1}{4}, \frac{1}{8}, \frac{1}{16}, \frac{1}{32}\}) = 1, 2, \text{ or } 4$
i_s=floor(UE_ID/N) mod Ns=1, 2 or 4

While the PF and PO are predefined in the network, the number of MTC devices to be paged, however, is not constant over time. In some cases, the number is much higher than current capacity. In general, if MTC paging is considered second priority, then there is a chance that the network is not able to insert the device ID in time at the PO for devices due to insufficient paging space, which would cost significant delay. It is unknown that how good that network could provision the pages. If the network cannot provide even paging load, and constantly drop pages due to long delayed paging request, it may incur more page request from core network due to "re-page". Some unlucky MTC devices may experience page blackout indefinitely.

Figure 5:
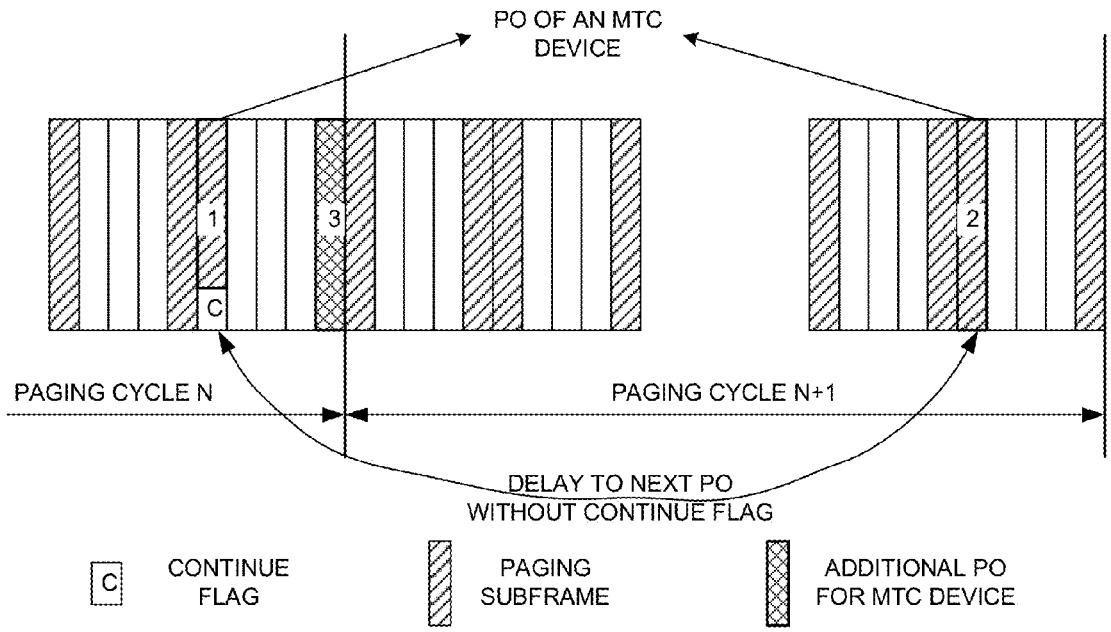
FIG. 5 illustrates one embodiment of adaptive paging design for MTC devices.

FIG. 5 illustrates one embodiment of adaptive paging design for MTC devices. Normal UE only has to wake up one subframe (PO) per DRX cycle in idle mode. MTC devices typically apply the longest DRX cycle of the UE specific DRX value. In addition to DRX in idle mode, MTC device may have even longer sleep cycle if the DRX value is not long enough for operation. An MTC device turns of its radio completely in sleep mode, and the MTC user or the network cannot reach/trigger/page the MTC device in sleep mode. Therefore, as illustrated in FIG. 5, the PO for an MTC device occurs at subframe #1 in paging cycle N, and subframe #2 in the next paging cycle N+1. In each paging cycle, the MTC device monitors its PO at goes to DRX until the next PO. For example, if the MTC device does not receive paging at subframe#1, then it goes to DRX until the next PO at subframe #2.

Under adaptive paging, extra paging occasions are adaptively allocated. In the embodiment of FIG. 5, a "continue" flag is introduced in the paging message. When the eNB cannot insert all the pages in the corresponding PO, it set the "continue" flag to be TRUE. Normal UE would ignore the flag and proceed as legacy behavior. For MTC devices, however, when the flag is set, instead of going to DRX until next P0, MTC devices would "continue" to monitor for PO if no paging has been received. For example, the MTC device monitors the PDCCH in the next N paging subframe, where N=1, 2, 3 ... etc. It is possible to include N along with the flag or N is pre-defined. It is also possible to configure which group of MTC devices needs to monitor the additional PO (e.g., subframe #3). For example, MTC devices can be configured to ignore the flag through dedicated signaling via RRC or NAS. The eNB could also broadcast the MTC group that should continue monitoring paging subframe. Once the MTC device receives paging, it stops paging monitoring disrespect of the flag and responds to the paging.

Group paging is another mechanism to enhance paging performance for MTC devices. M2M grouping can be useful in many levels. In AS level, a group ID can be configured for an M2M group. One paging can be used to page all MTC devices in the group monitoring paging. Such M2M group can be controlled by eNB to save AS resource. In NAS level, it makes sense that M2M grouping can be done in the core network level, e.g., controlled by MME to save signaling overhead. In application level, M2M grouping can be controlled by MTC user or MTC server for easier management. The different levels of M2M grouping can be independent or coexist to provide flexibility.

Figure 6:
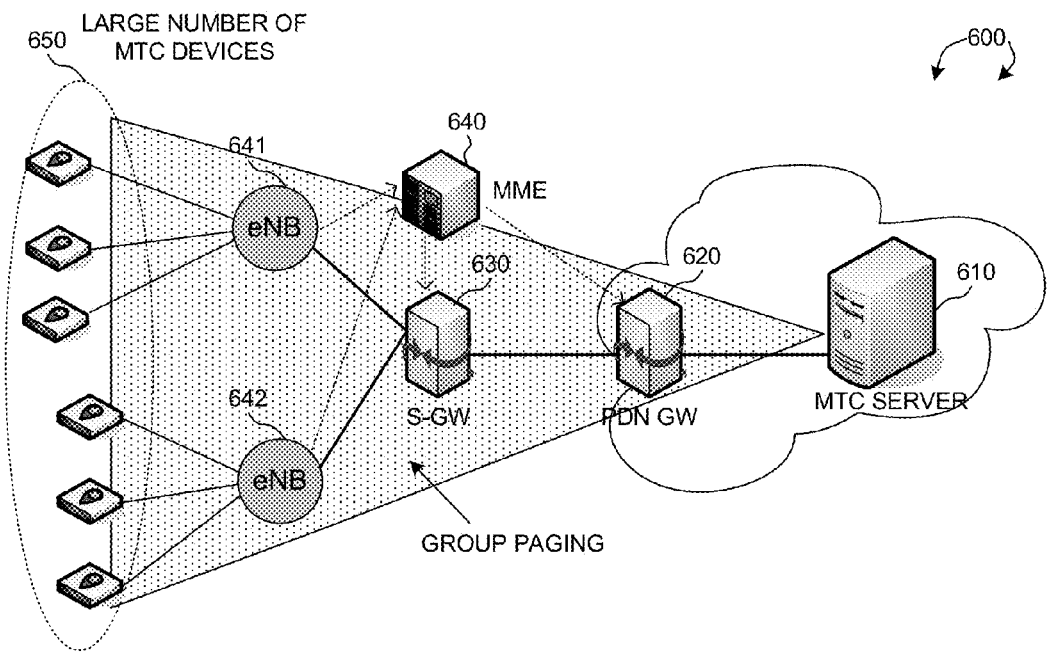
FIG. 6 illustrates group paging in a 3GPP network.

FIG. 6 illustrates group paging in a 3GPP network 600. Mobile communication network 600 comprises a MTC server 610, a packet data network gateway (PDN GW) 620, a serving gateway S-GW 630, a mobility management entity MME 640, base stations eNB 641 and eNB 642, and a large group of M2M devices 650. In the example of FIG. 6, due to device management, e.g., software update or periodic polling, MTC server 610 needs every MTC device in the group to response. Without the support of group paging, the signaling of page needs to be done one by one. With the support of group paging, MTC server 610 sets up an M2M group with a group ID based on the M2M application for all the MTC devices 650. MTC server 610 sends the group ID to MME 640, MME 640 then sends a page request to connected eNB 641 and eNB 642 with the group ID, and eNB 641 and eNB 642 inserts the group ID into paging messages. By supporting group paging, the signaling is optimized.

FIG. 7 illustrates one example of an RRC paging message 700. A paging message contains a list of paging records. Each paging record contains a UE identity, which is a choice between International Mobile Subscriber Identity (IMSI) and Serving Temporary Mobile Subscriber Identity (S-TMSI). Various group IDs may be used for group paging. In a first embodiment, group paging is done based on IMSI. In a second embodiment, group paging is done based on S-TMSI.

Figure 8:
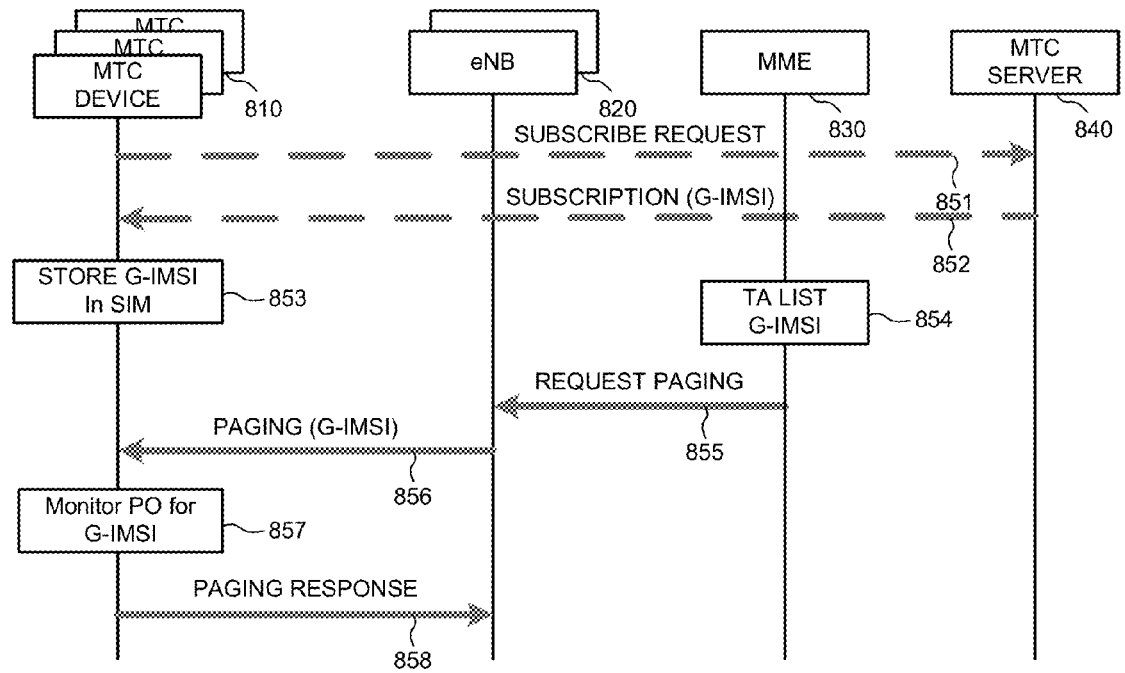
FIG. 8 illustrates one embodiment of group paging using G-IMSI for group paging ID.

FIG. 8 illustrates one embodiment of group paging using G-IMSI for group paging ID. In additional to IMSI, each MTC device is configured with a Group IMSI (G-IMSI). For each G-IMSI and IMSI, upper layer should indicate whether corresponding paging occasion should be followed or not. In step 851, a group of MTC devices 810 subscribe to MTC services to MTC server 840. In step 852, MTC server 840 confirms to the MTC devices with subscription information, which includes a group paging ID (G-IMSI). In this example, the paging group is pre-defined by the MTC server and the stored in SIM (step 853) of each MTC device. MME 830 maintains a TA list for the G-IMSI (step 854). In step 855, MME 830 sends a paging request to concerned eNBs 820. In step 856, eNBs 820 send paging messages to the group of MTC devices 810. A new mechanism could be used for monitoring PO for G-IMSI, which is less frequency than IMSI (step 857). For example, a different paging cycle or nB is defined for G-IMSI. Finally, after matching the G-IMSI contained in the paging message, MTC devices 810 send paging response back to eNBs 820 (step 858). Typically, RRC connections are established and bearers are activated for the MTC devices.

Figure 9:
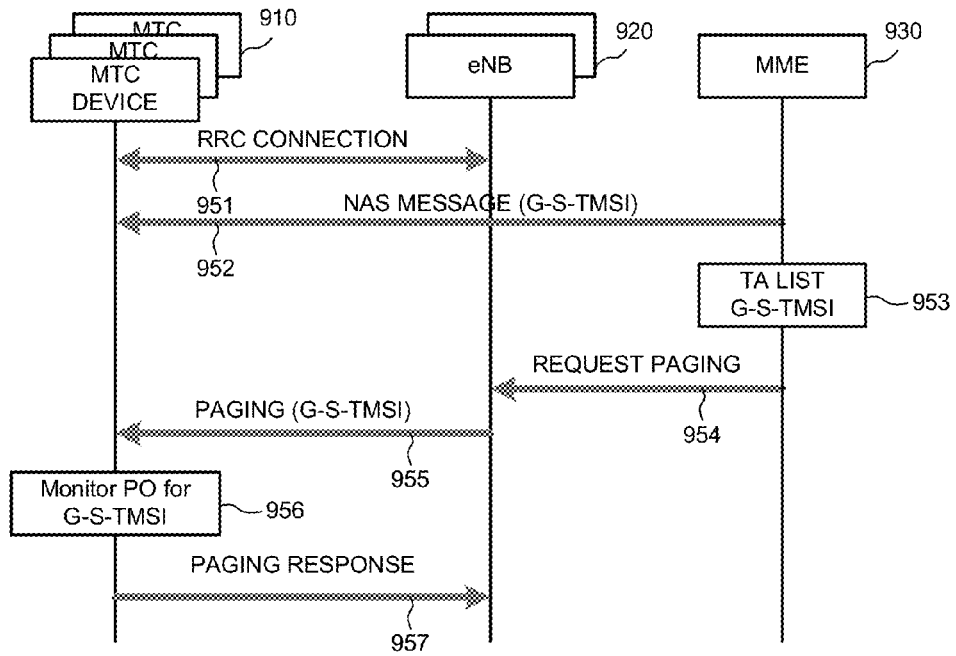
FIG. 9 illustrates one embodiment of group paging using G-S-TMSI for group paging ID.

FIG. 9 illustrates one embodiment of group paging using G-S-TMSI for group paging ID. In addition to S-TMSI, each MTC device is configured with a Group S-TMSI (G-S-TMSI) upon attach to the network. In step 951, a group of MTC devices 910 establishes RRC connection with one or more eNBs 920. In step 952, MME 930 sends a NAS signaling message to the MTC devices. The NAS signaling message contains configuration information that configures a group paging ID (G-S-TMSI) for the MTC devices. In this example, the G-S-TMSI paging group is flexible and can be changed by NAS signaling. For example, MME 930 can configure the grouping based on its own decision or information from a Home Subscriber Server (HSS). In step 953, MME 930 maintains a TA list for the G-S-TMSI. In step 954, MME930 sends a paging request to concerned eNBs 920. In step 955, eNBs 920 send paging messages to the group of MTC devices 910. In step 956, MTC devices 910 monitors P0. The G-S-TMSI grouping does not change paging monitoring. Finally, after matching the G-S-TMSI contained in the paging message, MTC devices 910 send paging response back to eNBs 920 (step 957). Typically, RRC connections are established and bearers are activated for the MTC devices.

Other mechanism can be used to further enhance the grouping paging support. For example, finer granularity or more flexibility may be provided using additional rules sent along with the group paging ID. In one embodiment, the paging rules may contain a "mask" or "wildcard" for a group of device IDs. For example, a question mark "?" can be used as a wildcard for either 0 or 1. A group paging ID of "101011??" implies that all devices having device IDs that are equal to "10101100", "10101101", "10101110", or "10101111" are paged. In another embodiment, an operand is provided for group paging ID. To conduct complicated group paging tasks, logical operands AND/OR/NOT, M2M categories and/or attributes, and MASKS can be used together to form a group paging rule. For example, one paging rule may be to page all MTC devices that has (priority=1) AND (category=smart meter), another paging rule may be to page all MTC devices that belongs to (paging group=111100??) AND (attribute=periodic reporting).

The paging groups can be managed differently at different level. In a first example, the entire Public Land Mobile Network (PLMN) shares the same paging group. Group X under one eNB or TA and group X under another eNB or TA belongs to the same paging group X. In a second example, the entire TA shares the same paging group. Group Y under one TA and group Y under another TA are different. Within the same TA, group Y' under one eNB and group Y' under another eNB belong to the same paging group Y'. In a third example, the paging group is unique under certain eNB. Group Z under one eNB and group Z under another eNB are different. The size if a paging group can also be optimized. If a paging group is too large, it would lead to high RACH collision probability, which result in longer delay and more power consumption. On the other hand, if a paging group is too small, then RACH resource is not sufficiently utilized. When group paging is requested from PLMN or MTC server, instead of sending the complete UE identity (IMSI or S-TMSI), group identities (optionally with operands and rules) are sent. Once configured with group identities, an MTC device monitors the paging for the group at corresponding paging occasion and resource. It responds to the paging if there is a matching group identity or meets the rules combination.

Figure 10:
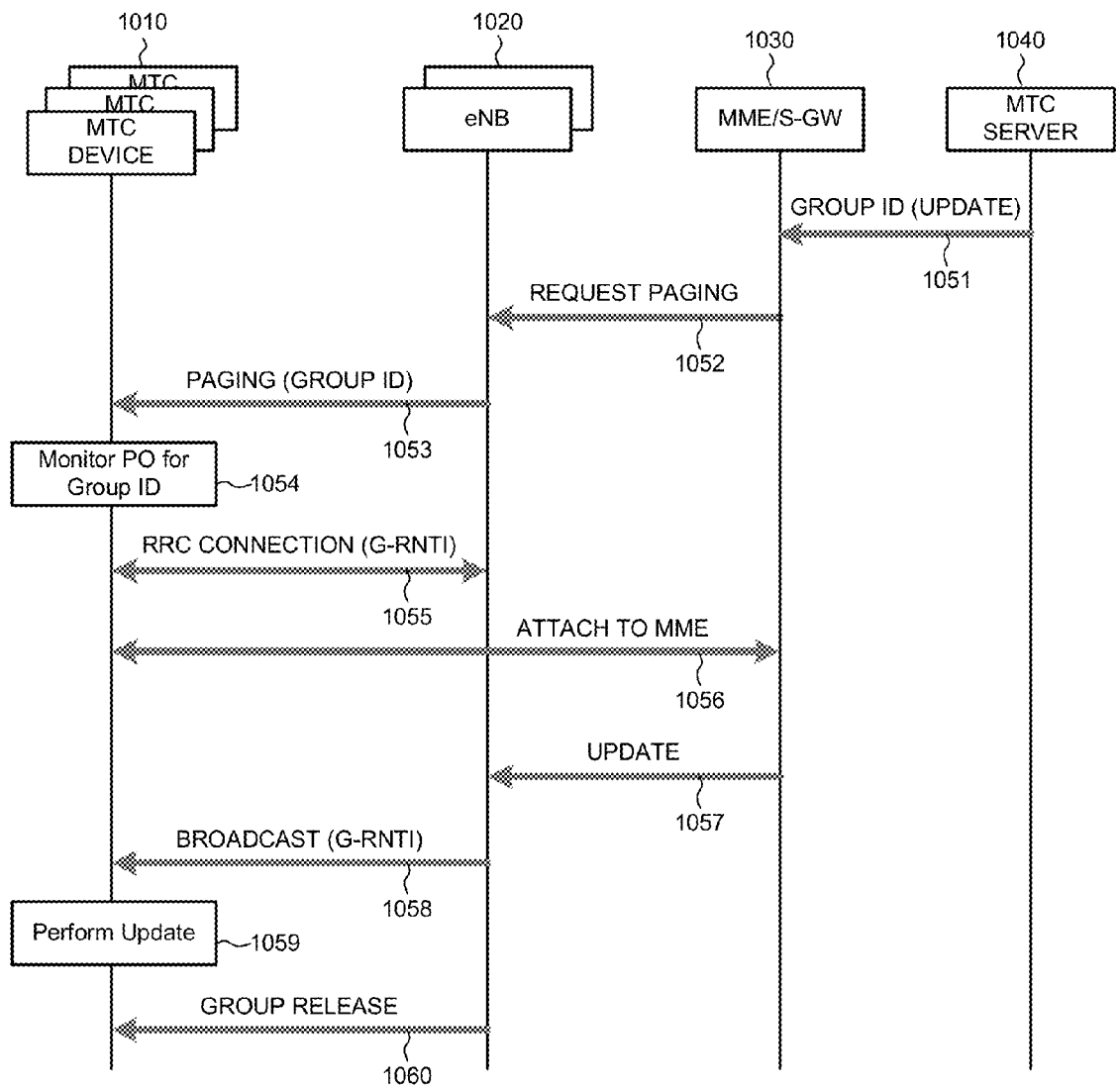
FIG. 10 illustrates one embodiment of group broadcasting using group paging mechanism.

Group paging may be used for Group broadcasting. In some MTC applications, e.g., OAM or software update, it is likely that the content of message would be the same for a group of MTC devices. Therefore, group broadcasting would be useful and save radio resource. FIG. 10 illustrates one embodiment of group broadcasting in a 3GPP network. In step 1051, MTC server 1040 sends a group ID to MME 1030 with optionally indication of the purpose, e.g., group software update. In step 1052, MME 1030 sends a paging request to one or more concerned eNB 1020 with the group ID. In step 1053, eNB 1020 insert the group ID into paging message and send the paging message to a group of MTC devices 1010. The MTC devices monitor PO for the group ID (step 1054). Upon receiving the paging message, the MTC devices 1010 establish RRC connection with eNB 1020 (step 1055). A group RNTI (G-RNTI) is assigned during connection setup or RRC reconfiguration. The MTC devices 1010 also attach to MME 1030 and establish bearer to an S-GW (step 1056). In step 1057, MME/S-GW sends the software update message using the Group ID to eNB 1020. The update message is for all MTC devices in the group.

In step 1058, eNB 1020 uses G-RNTI to broadcast the update message to all MTC devices in the group. The MTC devices in the group use the G-RNTI for PDCCH monitoring of the broadcast data (e.g., software update). If there is no HARQ, similar to BCCH (cell broadcast channel, e.g., a new SIB on BCCH), PHY mechanism is used to guarantee the successful rate, e.g., repetition, TTI bundling. If HARQ is used, then eNB assumes the HARQ feedback is NACK until reach max HARQ retransmission. MTC devices successfully receive the TB would send nothing, MTC devices cannot decode the TB would send NACK, and eNB would retransmit if there is at least one NACK received. The NACK could be done in MAC instead of PHY. In step 1059, MTC devices 1010 perform software update.

The group of attached MTC devices can be released using a group release command (e.g., step 1060). For example, a signaling message as the broadcast version of RRCConnectionRelease is used to indicate the applied type of devices. When low priority devices see the message, they perform RRC Connection Release to release resources. The message could be transmitted on a cell broadcasted channel (e.g., a new SIB on BCCH) to which only concerned MTC devices listen.

Figure 11:
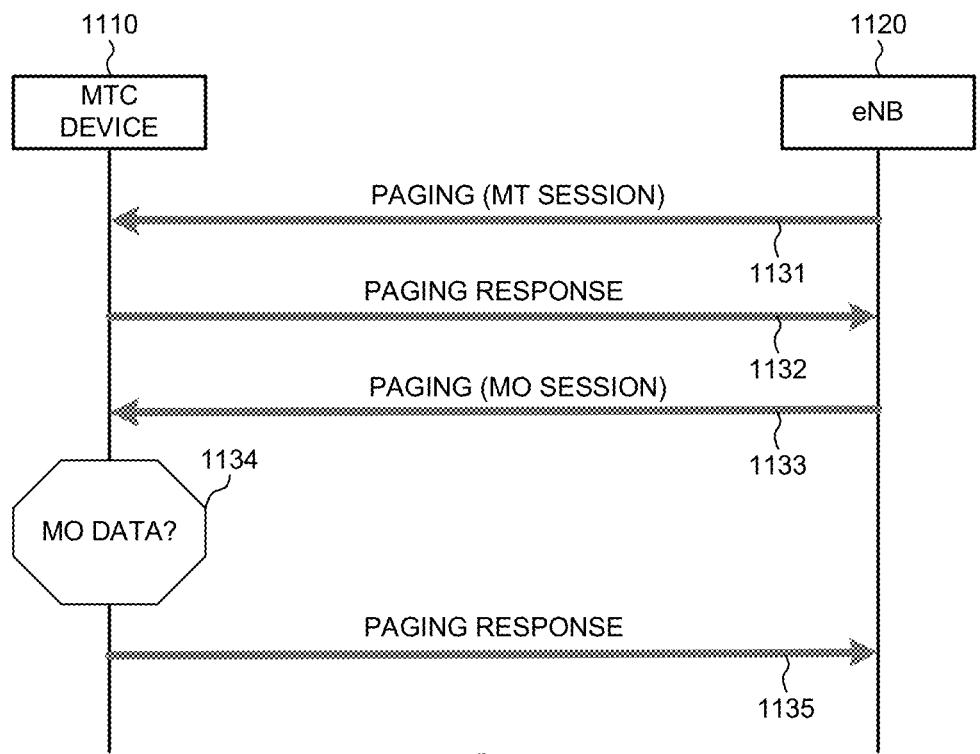
FIG. 11 illustrates examples of paging associated with an MO session or an MT session.

FIG. 11 illustrates examples of M2M paging associated with an MO session or an MT session. For M2M paging, when a device ID is included in paging message, it may have two possible meanings. In a first meaning, upon receiving the paging (step 1131), the paged MTC device must wake up and establish connection (step 1132) (Mobile Terminated MT session). In a second meaning, the network asks the paged MTC device whether it would like to wake up to establish connection (Mobile Originated MO session). Once the MTC device receives the special paging (step 1133), it decides whether it meets the condition and needs to reply with MO data (step 1134). If the MTC device decides to reply MO data, then it has to initiate connection establishment procedure, e.g., RACH preamble transmission (step 1135).

Polling MO from CN or MTC server is a flexible scheme to implement end-to-end load control if data traffic is predictable. The main benefit of paging based scheme for MO, e.g., as compared to predefined time scheduling scheme that can be controlled by BCCH, is flexibility. MO paging could offload the traffic beforehand. For delay tolerant applications, e.g. meter reading, it is also possible to completely disable MO request and reply solely on MO paging to get data from MTC devices. This could decrease the chance of RAN overload (e.g., RACH overload) due to traffic burst created by badly coordinated MO sessions, e.g., different type of meter readings at the same time. In addition to MO, there is need for all MTC devices to support MT session, e.g., for OAM or software update purposes. Thus, a paging message should indicate whether the paged MTC device should respond immediately (MT session) or should respond only based on availability of MO data (MO session).

Indication of the different paging responses could be done in various ways. In a first example, a flag or configuration option field in paging message, e.g., "MO Page" or "MT Page". In a second example, different P-RNTI may be used. In a third example, a special paging code or paging ID may be used. In a fourth example, the MTC devices may apply to pre-configured paging opportunities (e.g., normal paging (MT page) is sent in some paging opportunities and special paging (MO page) is sent in other paging opportunities).

In addition to indicate different paging responses, different response policies can be configured to optimize paging performance. In a first embodiment, paging response policy is pre-defined for the devices. For example, after receiving a paging message, a device may be configured to have three response policies. For the first policy, the device must connect to network immediately. For the second policy, the device must connect to network, but it could be delayed in certain degree. This policy can be combined with network entry congestion alleviation technique. For the third policy, the device may or may not connect to the network, e.g., device only connect to network when there is buffered data. The device may decide based on whether it has data to report or not (and/or the priority of data to report). The device may also decide based on the network load status.

In a second embodiment, paging response policy is dynamically assigned. The paging response policy may be defined in paging message (e.g., information element or flag bit, probability information). With probability information, instead of polling many devices individually, paging can be done with group identity and a probability (randomization is done at per UE basis). This is useful for certain usage, e.g., collecting group statistics. For example, a device rolls a dice and compare with the given probability to decide whether it would connect with the network. The paging response policy may also be configured before/when the device enters idle mode (e.g., deregister message or other signaling).

Figure 12:
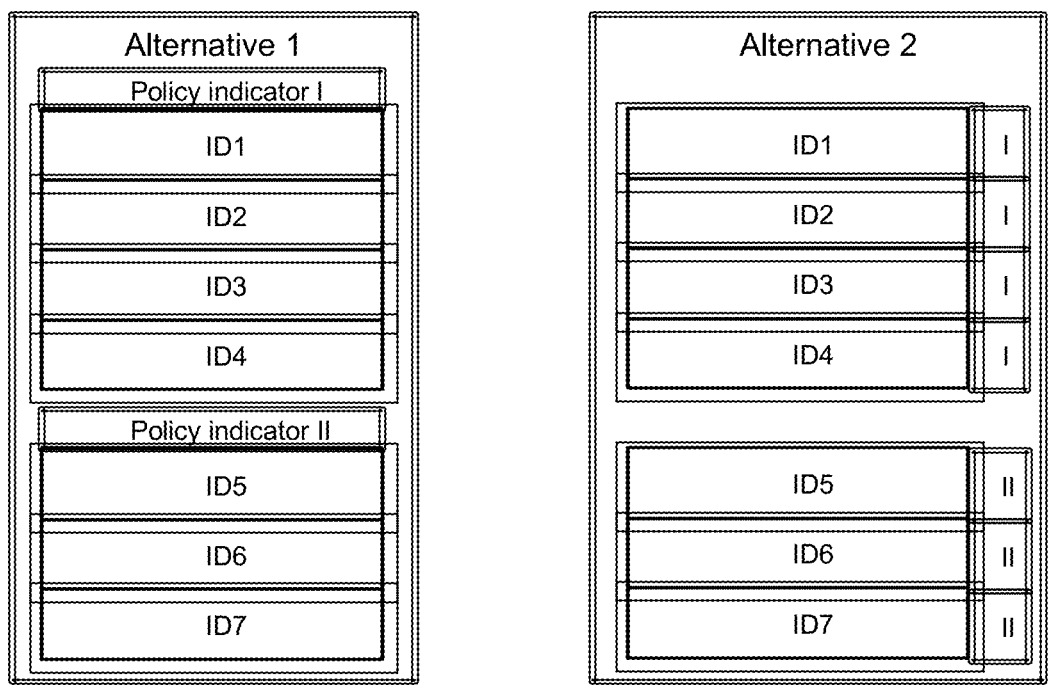
FIG. 12 illustrates two alternatives of dynamically assigning paging response policies.

FIG. 12 illustrates two alternatives of dynamically assigning paging response policies. In the example of FIG. 11, paging response policies are contained in paging message. For example, loading-aware policy and/or differentiated access class policy can be carried via the paging message. In a first alternative, within one paging message, each policy indicator is followed by a set of paging device IDs that applies the policy. For example, paging device ID1, ID2, ID3, and ID4 apply a response policy under policy indicator I, while paging device ID5, ID6, and ID7 apply another response policy under policy indicator II. In a second alternative, within one paging message, each paging device ID is followed by a corresponding policy indicator. For example, each paging device having ID1-ID4 is associated with policy indicator I, while each paging device having ID5-1D6 is associated with policy indicator II.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a paging message transmitted for one or multiple groups of machine-to-machine (M2M) from a base station by a M2M device in a mobile communication network, wherein the base station is a fixed infrastructure unit in the mobile communication network, wherein the paging message embeds a paging response type of either a mobile originate (MO) type or a mobile termination (MT) type, wherein the MT type indicates the M2M must wake up to establish a connection automatically and the MO type indicates the M2M needs to decide whether to wake up to establish connection automatically;

determining whether to respond to the paging message based on a paging matching rule, one or more paging response policy, and the paging response type, wherein each paging response policy applies to one or more M2M;

establishing a connection with the base station in the mobile communication network; and receiving a group broadcasting message from the base station, wherein the group broadcasting message contains a group Radio Network Temporary Identifier (G-RNTI).

2. The method of claim 1, further comprising:
receiving group identification (ID) configuration information by the M2M device, wherein the M2M device is configured with a group ID.

3. The method of claim 2, wherein the group ID contains a group Serving Temporary Mobile Subscriber Identity (G-S-TMSI) sent from a mobility management entity (MME).

4. The method of claim 2, wherein the group ID contains an M2M application ID controlled by an M2M server.

5. The method of claim 1, wherein the matching rule contains a paging mask that indicates multiple M2M devices or multiple M2M groups using a wildcard.

6. The method of claim 1, wherein the matching rule contains a logical operand that applies to a group paging identifier and an M2M group category/attribute.

7. The method of claim 1, wherein the paging response type is explicitly contained in the paging message.

8. The method of claim 1, wherein the paging response type is implicitly carried via a paging RNTI, a special paging code/ID, or a pre-configured paging opportunity.

9. The method of claim 1, further comprising:
receiving a group release message from the base station such that the connection is released if the M2M device belongs to a device type indicated by the group release message.

10. The method of claim 1, wherein the M2M device only attempts to establish RRC connection if it has buffered data, and wherein the M2M device does not attempt to establish RRC connection if there is no buffered data.

11. A Machine Type Communication (MTC) device, comprising:
a radio frequency module (RF module) that receives a paging message for one or multiple groups of machine-to-machine (M2M) transmitted from a base station in a mobile communication network, wherein the base station is a fixed infrastructure unit in the mobile communication network, wherein the paging message embeds a paging response type of either a mobile originate (MO) type or a mobile termination (MT) type, wherein the MT type indicates the M2M must wake up to establish a connection automatically and the MO type indicates the M2M needs to decide whether to wake up to establish connection automatically;

a paging management module that determines whether to respond to the paging message based on a paging matching rule, one or more paging response policy, and the paging response type, wherein each paging response policy applies to one or more M2M; and a connection management module that establishes a connection with the base station such that the MTC device receives a group broadcasting message from the base station, wherein the group broadcasting message contains a group Radio Network Temporary Identifier (G-RNTI).

12. The MTC device of claim 11, wherein the RF module receives group identification (ID) configuration information, and wherein the M2M device is configured with a group ID.

13. The MTC device of claim 12, wherein the group ID contains a group Serving Temporary Mobile Subscriber Identity (G-S-TMSI) sent from a mobility management entity (MME).

14. The MTC device of claim 12, wherein the group ID contains an M2M application ID controlled by an M2M server.

15. The MTC device of claim 11, wherein the matching rule contains a paging mask that indicates multiple MTC devices or multiple MTC groups using a wildcard.

16. The MTC device of claim 11, wherein the matching rule contains a logical operand that applies to a group paging identifier and an M2M group category/attribute.

17. The MTC device of claim 11, wherein the paging response type is explicitly contained in the paging message.

18. The MTC device of claim 11, wherein the paging response type is implicitly carried via a paging RNTI, a special paging code/ID, or a pre-configured paging opportunity.

19. The MTC device of claim 11, wherein the RF module receives a group release message from the base station such that the connection is released if the MTC device belongs to a device type indicated by the group release message.

20. The MTC device of claim 11, wherein the MTC device only attempts to establish RRC connection if it has buffered data, and wherein the M2M device does not attempt to establish RRC connection if there is no buffered data.

21. The method of claim 1, wherein the paging response policy is predefined for the M2M device.

22. The method of claim 1, wherein the paging response policy is dynamically assigned.

23. The method of claim 1, wherein the paging response policy is configured before or when the M2M device enters an idle mode.

* * * * *